United States Patent Office 3,579,607
Patented May 18, 1971

---

3,579,607
POLYESTER-SUBSTITUTED ORGANOSILICON COMPOSITIONS
Markus Matzner, Edison, and Allen Noshay, East Brunswick, N.J., assignors to Union Carbide Corporation, New York, N.Y.
No Drawing. Filed Jan. 17, 1969, Ser. No. 792,132
Int. Cl. C08g 39/10, 47/10, 17/13
U.S. Cl. 260—824          13 Claims

ABSTRACT OF THE DISCLOSURE

This invention relates to cyclobutane diol polyester-substituted organosilicon compositions characterized by a polymeric segment or block that is composed of recurring cyclobutylene groups linked to each other through carbonate linkages (—OCOO—) or di(carbonyloxy)hydrocarbylene linkages and that is chemically bonded to a silicon atom. The novel compositions have a silicon-containing segment derived from a silane or a siloxane. In the latter case, the compositions are block copolymers. The compositions are stable to heat and light and are useful as protective coatings, molding resins and elastomers.

---

This invention relates to cyclobutane diol polyester-substituted organosilicon compositions characterized by a polyester polymeric segment or block that is composed of recurring cyclobutylene groups linked to each other through carbonate linkages (—OCOO—) or di(carbonyloxy)hydrocarbylene linkages (—OOCR°COO—) and that is chemically bonded to a silicon atom. The valences of silicon in the compositions that are not bonded to such polyester segments are bonded to such groups as the monovalent hydrolyzable groups, hydroxyl groups, monovalent hydrocarbon groups, hydrogen atoms or oxygen atoms of siloxane linkages. The chemical bond between the polyester block and the silicon atom can be provided by any suitable divalent atom or group such as the following:
—O—, —S—, —NR—, —R°—,

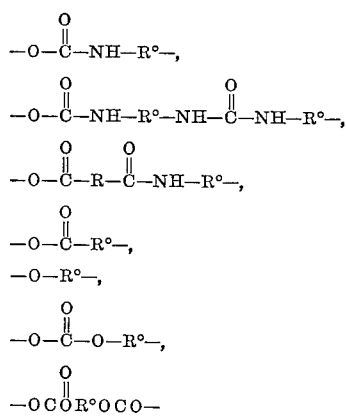

and

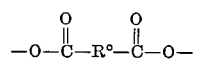

wherein the valence on the right is bonded to silicon, the valence on the left is bonded to the polyester block, R is a monovalent hydrocarbon group or hydrogen and R° is a divalent hydrocarbon group.

A preferred class of the compositions of this invention are silanes having the formula:

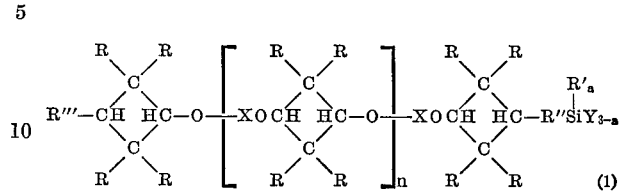

wherein R is a hydrogen atom or a monovalent hydrocarbon group, $n$ is a positive number, R′ is a monovalent hydrocarbon group, $a$ has a value from 0 to 2 inclusive, X is —CO— or —OCR°CO—, R° is a divalent hydrocarbon group, Y is a monovalent hydrolyzable group, R″ is a divalent oxygen atom or a divalent organic group having a carbon atom bonded to the adjacent silicon atom and an oxygen atom bonded to the adjacent

group and R‴ is

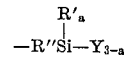

a hydroxyl group, an alkoxy group (e.g., a methoxy, ethoxy, butoxy or pentoxy group) or an acyloxy group (e.g., an acetoxy, propanoyloxy or butanoyloxy group).

Another preferred class of the compositions of the invention are block copolymers comprising from 1 to 99 weight percent of polyester blocks having the formula:

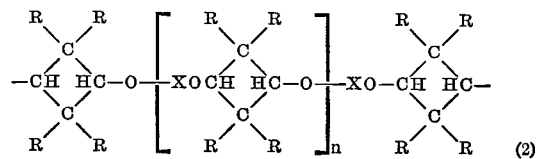

wherein R, $n$ and X have the above-defined meanings and form 1 to 99 weight percent of siloxane blocks comprising groups having the formula:

wherein Z is a monovalent hydrocarbon group, a hydrocarbonoxy group, a divalent oxygen atom bonded to the silicon atom and to a

group of the polyester block or a divalent organic group having a carbon atom bonded to the silicon atom and an oxygen atom bonded to a

group of the polyester block, and $b$ has a value from 1 to 3 inclusive, each siloxane block having at least one such divalent atom or group represented by Z.

The block copolymers of this invention can have siloxane blocks containing, in addition to the groups represented by Formula 3, groups represented by the formula:

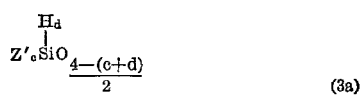
(3a)

wherein Z' is a monovalent hydrocarbon group, c has a value from 0 to 2 inclusive, d has a value from 1 to 3 inclusive and (c+d) has a value from 1 to 3 inclusive.

An especially preferred class of the compositions of this invention are thermoplastic block copolymers comprising (A) from 5 to 95 weight percent of at least two cyclobutane diol polyester blocks having the formula:

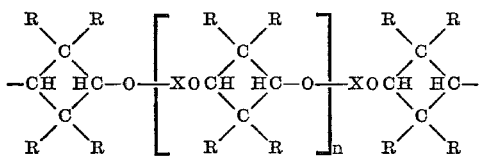

wherein R is a hydrogen atom or a monovalent hydrocarbon group, X is —CO— or —OCR°CO—, R° is a divalent hydrocarbon group, and n is a positive number, said polyester blocks each having a molecular weight from 2,000 to 50,000; and (B) from 5 to 95 weight percent of at least one siloxane block represented by the formula:

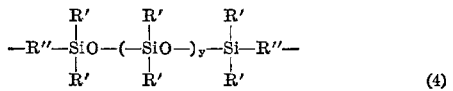
(4)

wherein R' is a monovalent hydrocarbon group, R" is a divalent oxygen atom bonded to the adjacent silicon atom and to a

group of the polyester block or a divalent organic group having a carbon atom bonded to the adjacent silicon atom of the siloxane block and an oxygen atom bonded to a

group of the polyester block and y is a positive number, each siloxane block having an average molecular weight from 500 to 100,000, said block copolymer having a reduced viscosity of at least 0.4 deciliter per gram.

The above-described especially preferred thermoplastic block copolymers of this invention can be elastomeric or rigid. The thermoplastic and elastomeric block copolymers preferably have a tensile modulus from 100 to 10,000 pounds per square inch, a polyester block content from 5 to 50 weight percent and a siloxane block content from 50 to 95 weight percent. The thermoplastic and rigid block copolymers preferably have a tensile modulus from 15,000 to 150,000 pounds per square inch, a polyester block content from 60 to 95 weight percent and a siloxane block content from 5 to 40 weight percent. Such thermoplastic and elastomeric or rigid block copolymers are elastomeric or rigid without being crosslinked.

Illustrative of the monovalent hydrocarbon groups that are represented by R in Formula 1 and 2, R' in Formula 1 and 4, Z in Formula 3 and Z' in Formula 3a are the alkyl groups (for example, the methyl, ethyl, n-propyl, iso-propyl, n-butyl, sec-butyl, isobutyl, t-butyl, n-octyl, decyl, dodecyl, groups), the cycloalkyl groups (for example, the cyclopropyl, cyclobtuyl, cyclopentyl, cyclohexyl, cycloheptyl groups), the alkenyl groups (for example, the vinyl, allyl, crotyl, 3-butenyl, 1,3-butadienyl, allenyl groups), the cycloalkenyl groups (for example, the cyclopentyl, cyclohexenyl groups, the alkynyl groups (for example, the ethynyl, propargyl groups), the aryl groups for example, the phenyl, naphthyl, phenathrenyl, anthracenyl groups), the aralkyl groups (for example, the benzyl, 2-phenylethyl, 2-phenyl propyl, cumyl groups), the alkaryl groups (for example, the tolyl, t-butylphenyl, styryl, cyclohexylphenyl groups).

Ilustrative of the divalent hydrocarbon groups represented by R° in Formula 1 are the alkylene groups (e.g., the methylene, ethylene, propylene, butylene, and arylene groups), the arylene groups, e.g., the ortho, meta and para phenylene groups) and the alkenylene groups (e.g., the —CH=CH—, —CH₂CH=CHCH₂ and

—CH₂CH₂CH=CHCH₂ groups).

Illustrative of the monovalent hydrolyzable groups represented by Y in Formula 1 are the halogen atom (e.g. chlorine and bromine, the alkoxy groups (e.g., the methoxy, ethoxy, propoxy and butoxy groups, the aroxy groups (e.g., the phenoxy group), the NH₂ group the dialkylamino groups (e.g., Me₂N— and Et₂N—) and the like.

Illustrative of the divalent organic groups represented by R" in Formula 1 are the —O—R°— groups wherein R° is as defined above. Also R" can be any of the following type groups:

—OOCNHR°—, —OOCNHR°NHCOR°—,
—OOCR°—, —COOCR°—, —O(R°O)ᵥR°—

etc. where R° is as defined above, w is an integer, the bond on the right is attached to silicon and the bond on the left is attached to the polyester block.

Illustrative of the hydrocarbonoxy groups represented by Z in Formula 3 are the above mentioned alkoxy groups and aryloxy groups.

In the above formulas, the symbols representing the numbers and types of groups need not have the same meaning at each occurrence throughout the composition. For example, in given block copolymer having groups represented by Formula 3a above, some of such groups can be a dimethylsiloxane groups while other of such groups can be methylphenylsiloxane groups and/or triphenylsiloxane groups.

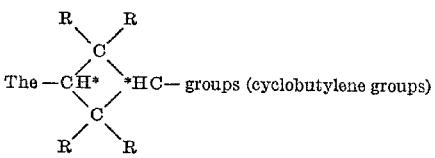

in the compositions of this invention can exist in either of two stereoisomeric forms (cis and trans) depending on the relative position of the two hydrogen atoms (*). In order to impart optimum processability to the compositions, it is preferred that from 20 to 80 weight percent of the cyclobutylene groups are the trans isomer. More desirably, from 40 to 60 weight percent of the cyclobutylene groups are the trans isomer. Compositions having trans contents outside the preferred range are higher melting and more difficult to process by molding, extruding, etc.

The compositions of this invention can be produced by reacting a cyclobutane diol polyester having reactive end groups with a silane or a siloxane having groups reactive with the reactive end groups of the polyester. In such reactions, the nature of these reactive groups determines the structure of the divalent organic group represented by R″ in Formulas 1 and 4 and Z in Formula 3. These reactions can be illustrated by the following equations:

$$\equiv COH + Me_2NSi\equiv \rightarrow \equiv C\text{---}O\text{---}Si\equiv + Me_2NH \quad (a)$$

$$\equiv COH + ClSi\equiv \rightarrow \equiv C\text{---}O\text{---}Si\equiv + HCl \quad (b)$$

$$\equiv COH + OCN(CH_2)_3Si\equiv \rightarrow \equiv COOCNH(CH_2)_3Si\equiv \quad (c)$$

$$\equiv COH + OCNC_6H_4NCO \rightarrow \equiv COOCNHC_6H_4NCO \quad (d\text{-}1)$$
$$\equiv COOCNHC_6H_4NCO + H_2N(CH_2)_3Si\equiv \rightarrow$$

$$\equiv COOCCNHC_6H_4NHCONH(CH_2)_3Si\equiv \quad (d\text{-}2)$$

$$\equiv COCOCl + H_2N(CH_2)_3Si\equiv \rightarrow$$
$$\equiv COOCNH(CH_2)_3Si\equiv + HCl \quad (e)$$

$$\equiv COH + ClOC(CH_2)_2Si\equiv \rightarrow$$
$$\equiv COOC(CH_2)_2Si\equiv + HCl \quad (f)$$

$$\equiv COH + Br(CH_2)_4Si\equiv \rightarrow \equiv CO(CH_2)_4Si\equiv + HBr \quad (g)$$
$$\equiv COOCCl + CH_2=CHCH_2OH \rightarrow$$

$$\equiv COOCOCH_2CH=CH_2 + HCl \quad (h\text{-}1)$$
$$\equiv COOCOCH_2CH=CH_2 + HSi\equiv \rightarrow$$

$$\equiv COOCOCH_2CH_2CH_2Si\equiv \quad (h\text{-}2)$$

In Equations $a$ through $d$-1, $f$ and $g$, $\equiv COH$ represents a carbinol group of the terminal cyclobutylene group in the polyester. In the other equations, the group on the far left represents a reactive group derived from such a carbinol group. In general, the known reaction conditions for effecting the reaction between the reactive group of Equations $a$ through $h$-2 can be used when polyester and silane or siloxane reactants containing such reactive groups are employed in producing the compositions of this invention.

With particular reference to Equation $a$, above, it should be noted that this equation illustrates a process for producing a block copolymer of this invention wherein the siloxane and polyester blocks are linked by oxygen atoms. The process of Equation $a$ comprises reacting a polyester having the formula:

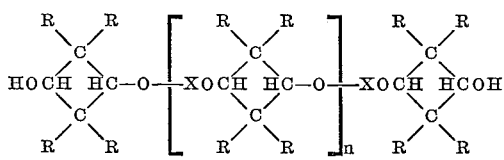

with a siloxane having the formula:

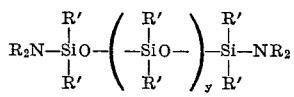

wherein R, X, R′ and $n$ and $y$ are defined above. The reaction produces the block copolymer and ammonia or an amine which are separated (e.g., by volatilizing the amine). The process can be conducted at a temperature of, for example, 50 to 130° C. in a solvent such as trichlorobenzene, dichlorobenzene or monochlorobenzene. The block copolymer can be separated from the solvent by adding a non-solvent such as methanol. The production of a block copolymer have the desired reduced viscosity is assured by exercising precise control of the reaction stoichiometry. This process has proven superior to other processes because the reaction is rapid and facile, the only byproduct is an easily removed, non-corrosive gas and the starting materials are easily prepared.

The following equation more specifically illustrates the reaction of Equation $a$ above for the case where a particular cyclobutane diol polycarbonate-siloxane block copolymer of this invention is being produced:

$$HO\text{---}CB\text{---}O(COO\text{---}CB\text{---}O)_{n+1}H + Me_2N(Me_2SiO)_{y+1}$$
$$Me_2SiNMe_2 \rightarrow H[O\text{---}CB\text{---}(COO\text{---}CB\text{---}O)_{n+1}$$
$$(Me_2SiO)_{y+1}Me_2Si]_mNMe_2 + nMe_2NH\uparrow \quad (i)$$

wherein $n$ and $y$ are as defined above, $m$ is an integer, Me is methyl and CB is

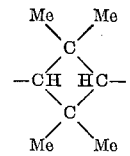

Equation $i$ above illustrates the preparation of an $(A\text{---}B)_m$ block copolymer from one mole of polycarbonate diol and one mole of bis-(dimethyl amino)-polydimethylsiloxane. The use of two moles of polycarbonate diol and one mole of bis-(dimethyl amino)-polydimethylsiloxane gives an A---B---A block copolymer of the following structure:

$$HO\text{---}CB\text{---}O(COO\text{---}CB\text{---}O)_{n+1}(Me_2SiO)_{y+1}$$
$$Me_2Si(O\text{---}CB\text{---}OCO)_{n+1}OCBOH$$

The cyclobutane diol polycarbonate reactants useful in producing the compositions of this invention as illustrated in Equation $i$ above can be produced in any of a variety of ways. By way of illustration, the cyclobutane diol polycarbonate reactant exemplified in Equation $i$ above can be produced by a melt polycondensation reaction illustrated by the equation:

$$HO\text{---}CB\text{---}OH + (C_6H_5O)_2CO \xrightarrow[\text{heat, vacuum}]{\text{Li catalyst}}$$
$$\text{(excess)}$$
$$HO\text{---}CB\text{---}O\text{---}(COO\text{---}CB\text{---}O)_{n+1}H + C_6H_5OH \uparrow$$

Variation of the excess of the diol relative to the diphenyl carbonate will determine the value of $n+1$ and thus the molecular weight of the oligomer. Another route to this polycarbonate involves a two-step solution process. The first step is the preparation of the dichloroformate as follows:

$$HO\text{---}CB\text{---}OH + 2COCl_2 \xrightarrow[CH_2Cl_2]{\text{Base}} ClCOO\text{---}CB\text{---}OCHOl$$

The dichloroformate product of the latter equation is then reacted in a second step with an excess of the diol as follows:

$$ClCOO\text{---}CB\text{---}OCOCl + HO\text{---}CB\text{---}OH \xrightarrow[\text{solvent}]{\text{pyridine}}$$
$$HO\text{---}CB\text{---}O\text{---}(COO\text{---}CB\text{---}O)_{n+1}H$$

Again, excess of the diol will determine the molecular weight of the oligomer. A third process for producing the polycarbonate is illustrated by the equation:

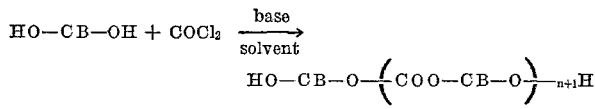

In addition to the polycarbonate reactants indicated above, composition of this invention can be produced from cyclobutane diol polyesters which are in turn produced by reacting an excess of the cyclobutane diol with an aliphatic or aromatic dicarboxylic acid (e.g., oxalic malonic, succinic, glutaric, adipic, maleic, phthalic, isophthalic or terephthalic acid). Known esterification procedures can be used to produce such polyesters. Such polyester reactants result in compositions of this invention wherein the cyclobutylene groups are linked by di(carbonyloxy)hydrocarbylene linkages (e.g., X in Formulas 1 and 2 is —OCR°CO—).

The silane and siloxane reactants used to produce the compositions of this invention are well known materials than can be produced by conventional methods.

The compositions of this invention containing silicon-bonded alkenyl groups can be polymerized or cured via such known groups using known processes (e.g., heat and free radical catalysts). By way of illustration a thermoplastic block copolymer as above defined wherein from 0.1 to 3.0 mol percent of the silicon-bonded monovalent hydrocarbon groups [R' in Formula 4] are alkenyl groups can be cured by heating at a temperature from 100° C. to 300° C. in the presence of a catalytic amount (from 0.1 to 5.0 weight percent based on the weight of the block copolymer) of a peroxide catalyst (e.g., an aryl peroxide such as benzoyl peroxide or an alkyl peroxide such as ditertiary butyl peroxide) to produce a thermoset product. Such thermoset products are useful as coating resins or elastomers.

The block copolymers of this invention can contain other groups and blocks in addition to those specifically set out hereinabove. Thus the siloxane block can contain any of a wide variety of other well known siloxane groups (e.g., nitroarylsiloxane, haloalkylsiloxane, fluoro alkyl siloxane, cyanoalkylsiloxane, and carbalkoxyalkylsiloxane groups and the like) as well as silicate groups. Similarly small amounts of other diols (e.g., 1,2-ethylene glycol, 1,3-propylene glycol, and 1,6-cyclohexane dimethylene diol) or substituted dicarboxylic acids can be used in producing the polyester blocks. Further, other amorphous blocks can be present in the block copolymers in addition to the siloxane blocks (e.g., polylactone blocks or polyester blocks produced from diols other than cyclobutane diols).

As is apparent to one skilled in the art, the blocks in the compositions of this invention are normally endblocked, the possibility of cyclic structures being remote. Such endblockers are inconsequential in terms of their amount and effect on the properties and utilities of the compositions. Normally such endblockers will be residual reactive groups of the polyester and/or siloxane reactant used to produce the composition. At times, however, it may be desirable to "cap" the blocks by converting such reactive groups to less reactive groups (e.g., to convert phenolic or alcoholic hydroxyl groups to ether groups, OR°) by known methods. Where catalysts are used in the production of the compositions, the blocks may be enblocked by catalyst residues. Endblocking by impurities is also a possibility.

The compositions of this invention can be discrete chemical compounds or block copolymers. Usually however, they are usually mixtures of various discrete compounds or copolymers due in part to the fact that the polymeric reactants used to produce the compositions of this invention are themselves usually mixtures.

The siloxane blocks in the block copolymers of this invention are amorphous and the polyester blocks are crystalline. The crystallinity of the polyester blocks imparts solvent resistance properties to the block copolymers. The block copolymers exhibit glass transition temperatures and melting points attributable to the amorphous and crystalline blocks.

Those block copolymers of this invention whose siloxane block content is relatively low (e.g., less than 20 weight percent) can be annealed in order to improve their physical properties. Annealing can be accomplished by heating the block copolymer at a temperature from 50° C. to 150° C. for from 0.5 to 6 hours. Apparently, annealing increases the crystallinity of the polyester blocks in the block copolymers.

The compositions of this invention are useful in a variety of areas wherein their desirable properties can be used to advantage. Thus the silanes of this invention can be used as sizes for fibrous glass, RTV compositions and protective coatings for metals. The thermoplastic block copolymers of this invention are generally useful as molding and extruding resins. The thermoplastic and elastomeric block copolymers of this invention are useful as fibers, packaging films and thermal insulation. The thermoplastic and rigid block copolymers of this invention are useful as protective coatings. The thermosetting block copolymers of this invention are useful as protective coatings and encapsulating resins.

The compositions of this invention possess desirable properties which make them especially useful in the above areas of application. By way of illustration, the compositions, even those wherein the polyester block is linked to silicon by an oxygen atom, are hydrolytically stable. The compositions are remarkably stable to oxidation, ultraviolet light and heat. The block copolymers are useful over a wide temperature range and are usually transparent. The solid block copolymers do not require annealing to achieve good physical properties although they may be annealed, if desired to further improve their properties. The solid thermoplastic block copolymers do not require curing or vulcanization to be useful as elastomers or rigid resins.

The phrase "molecular weight" is used herein to denote number average molecular weight.

The following examples illustrate the present invention:

In the examples appearing below, the following abbreviations are used:

| Abbreviation: | Meaning |
|---|---|
| RV | Reduced viscosity (defined below). |
| TMCBD | 2,2,4,4-tetramethylcyclobutane - 1,3-diol. |
| T. Mod. | Tensile modulus. |
| T. Str. | Tensile strength. |
| p.s.i. | Pounds per square inch. |
| E | Elongation. |
| Tg | Glass transition temperature (defined below). |
| Tm | Melting point. |
| g. | Grams. |
| Me | Methyl. |
| 100% Mod. | Stress (force per unit area of original cross section) required to extend a test sample 100%. |
| 300% Mod. | Stress (force per unit area of original cross section) required to extend a test sample 300%. |

 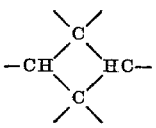

The reduced viscosities (RV's) of the block copolymers of the following examples were measured by the following technique: Reduced viscosity (RV) is determined by dissolving a 0.2 gram sample of the block copolymer in chloroform in a 100 milliliter volumetric flask so that the volume of the resultant solution is exactly 100 milliliters. The viscosity of the solution, after filtration through a sintered glass funnel, is determined in Cannon-Fenske viscometer at 25° C. Reduced viscosity values are obtained from the equation:

$$\text{Reduced Viscosity} = \frac{t_s - t_o}{(c) \times (t_o)}$$

wherein:

$t_o$ is the efflux time of the pure chloroform
$t_s$ is the efflux time of the block copolymer solution
$c$ is the concentration of the block copolymer solution expressed in terms of grams of block copolymer per 100 ml. of solution.

Glass transition temperature (Tg), commonly referred to as the second order phase transition temperature, refers to the inflection temperatures found by plotting the resilience (recovery from one percent elongation) of a film ranging in thickness from 3 to 15 mils against the temperature. See Brown, Textile Research Journal, 25, 891 (1955).

EXAMPLE I (A) Preparation of a cyclobutane dichloroformate

A cyclobutane dichloroformate having the formula:

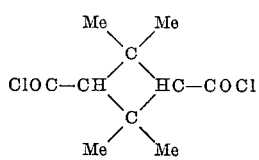

was prepared as follows: Place 72 g. (0.5 mole) of TMCBD and 800 ml. of methylene chloride in a 2 liter flask. Cool this slurry to 0–5° C. and add rapidly 84.5 ml. (1.2 moles) of phosgene all at once. With the temperature in the reaction vessel being maintained below 15° C., a solution of 95.9 g. of 2-picoline or 124.6 g. of 5-ethyl-2-picoline (1.03 moles) in 100 ml. of methylene chloride was added dropwise. After addition was complete, cooling was stopped and the reaction mixture was stirred for one hour at room temperature. The excess phosgene and methylene chloride were evaporated to dryness under vacuum. This operation was done with stirring and slight warming (~35–40° C.). The resulting residue was extracted with vigorous stirring five times with 300 ml. portions of anhydrous hexane at room temperature. The hexane extracts were combined, filtered to remove any excess amine hydrochloride, concentrated to a volume of 600 ml. and filtered through a column of 70 g. of celkate. The column was washed with one liter of hexane. The filtrate and washings were combined and the hexane distilled off on a Rinco evaporator. The resulting white crystalline TMCBD dicholroformate was ground in a mortar and mixed well in order to insure an even cis/trans isomer distribution. The yield of dichloroformate product was greater than 90%.

(B) Preparation of a cyclobutane polycarbonate (polycarbonate I)

A mixture of 49.5192 gms. of the dichloroformate of A above (0.184 mole), 28.8416 gms. of the diol (0.2 mole) and 400 ml. of toluene dried over 4A molecular sieve was placed in a 1 liter flask provided with a reflux condenser, dropping funnel, inert gas inlet-tube, magnetic stirrer and heating mantle. As the numbers above indicate 92 moles of the dichloro formate are used per 100 moles of the diol. Heating, stirring, and circulation of dry argon were started. At about 90° C. the mixture in the flask became homogeneous. In order to drive out all traces of air, the mixture was refluxed for approximately 5 minutes. It was then cooled to 90° C. and a solution of 31.085 ml. dry pyridine (0.03864 mole=5 mole percent excess over the dichloroformate) in 200 ml. toluene was added to it via the dropping funnel. The addition was accompanied by a strong of the oligomer by nuclear magnetic resonance indicated chloroformate/pyridine complex. After completion of the addition (~15 min.), the mixture was refluxed for 24 hours. During that period of time, a clear, colorless solution of the oligomer was formed in the flask, and a "sublimate" of pyridine hydrochloride had condensed on the upper inner walls of the flask, just above the liquid level. After cooling the toluene solution was transferred into a rotary evaporator and evaporated. The residue (97.1%) was redissolved in methylene chloride. This latter solution was washed first with acidic (HCl) water and then several times with distilled water until neutral. The methylene chloride solution was dried over magnesium sulfate and evaporated. The final product (Polycarbonate I) was obtained in a yield of 90.1%. It had an RV of 0.183. Both the diol and dichloroformate that were used had 50% trans cyclobutylene isomer content. Analysis of the oligomer by nuclear magnetic reasonance indicated that its trans cyclobutylene content was 49.1%. Titration of the OH end-groups by the method of J. S. Fritz and G. H. Schenk, Anal. Chem. 21, 1808 (1959) indicated percent HO=0.77 corresponding to a number average molecular weight of 4,422.

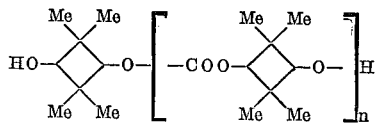

(C) Preparation of block copolymers of this invention

A block copolymer of the (A—B)$_n$ type was synthesized by the following procedure. A 4-neck, 500 ml. round bottom flask was fitted with a magnetic stirrer, a reflux condenser, an argon inlet and a stopcock sealed with a serum stopper. The apparatus was dried by heating while flushing with dry argon. Eight and eighty four hundreds gms. of the polycarbonate of B above (mol. wt. 4,422) (0.002 mole) and 350 ml. of dry chlorobenzene were charged into the flask. The mixture was heated to dissolve the oligomer. One hundred and fifty ml. of chlorobenzene was then distilled off to further dry the contents in the flask. The reaction solution was refluxed and magnetic stirring and a stream of dry argon were maintained throughout the experiment. Twenty and eight tenths gs. of a bis(dimethylamine)-terminated polydimethyl siloxane [Me$_2$NSiMe$_2$O(Me$_2$SiO)$_x$SiMe$_2$NMe$_2$] of mol. weight of 10,000 (0.002 mole) were now added, via syringe, to the flask. Evolution of the byproduct dimethylamine was observed. The mixture was refluxed for 19 hrs. At that time it was colorless, clear, and quite viscous. Another charge of 2.1 ml. of the polysiloxane was now added via syringe and the refluxing was continued. After 7 additional hours of heating, another charge of 2.1 ml. of the siloxane was added. Refluxing was continued for 21 additional hours. The final reaction mixture was very viscous, colorless, and clear. The total amount of siloxane used was 120% of "theory." This is probably due to the lack of very precise methods for the determination of the molecular weights of the oligomers. The total heating time was 46 hours, 55 minutes. After cooling, the reaction mixture was coagulated in excess methanol. An elastomeric, fibrous block polymer of this invention (Copolymer I) was obtained in an essentially quantitative yield. It had an RV of 0.96. It could be molded to a beautiful transparent, colorless, elastomeric film. A film was formed by compression molding Copolymer I at 270°. After 5 weeks in boiling water, the RV of the film was 0.65 indicating excellent hydrolytic stability. Copolymer I had the formula:

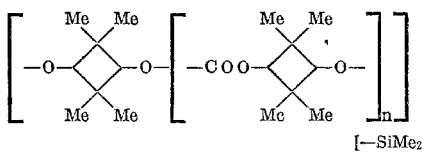

[—SiMe$_2$O(Me$_2$SiO)$_x$SiMe$_2$—]

EXAMPLE II

Using the procedure of Example IA, a dichloroformate of TMCBD was prepared. This dichloroformate (95 moles) and TMCBD (100 moles) were reacted in accordance with the procedure of Example IB to produce a polycarbonate to (Polycarbonate II) having an RV of 0.266, 0.535 wt. percent OH, a molecular weight of 6,365 and 51.0 wt. percent of the trans isomer.

Several block copolymers of this invention were produced in accordance with the procedure of Example IC by reacting Polycarbonate I or II with various molecular weight siloxanes (having the general formula Me$_2$NSiMe$_2$O(Me$_2$SiO)$_x$SiMe$_2$NMe$_2$ The composition and properties of these block copolymers (Copolymers I through X, all of which have trans isobutylene content of 51%) are shown in Table I along with, for the purposes of the composition, the composition and properties of a copolymer made from TMCBD (monomer) and a siloxane of the latter-mentioned type. All the block copolymers of Table I are of the (AB)$_n$ type.

TABLE I

| Copolymer | Mol wt. of blocks | | Properties of block polymers [1] | | |
|---|---|---|---|---|---|
| | Polycarbonate | Siloxane | RV [2] | RV [1] | Wt., percent siloxane |
| | [3] TMCBD | 442 | 0.164 | Oil | 71.3 |
| II | 4,420 | 442 | 0.94 | 0.83 | 7.4 |
| III | 4,420 | 1,700 | 0.86 | 0.68 | 26.7 |
| IV | 4,420 | 5,000 | 0.94 | 0.86 | 52.6 |
| V | 4,420 | 7,500 | 1.12 | 1.01 | 62.6 |
| I | 4,420 | 10,000 | 0.96 | 0.87 | 69.1 |
| VI | 6,350 | 442 | 1.08 | 0.95 | 5.2 |
| VII | 6,350 | 1,700 | 1.36 | 0.97 | 20.3 |
| VIII | 6,350 | 5,000 | 1.69 | 1.15 | 43.8 |
| IX | 6,350 | 7,500 | 1.73 | 1.17 | 54.0 |
| X | 6,350 | 10,000 | 1.08 | 0.84 | 61.1 |

[1] RV after coagulation of copolymer in methanol and molding of film at 270° C.
[2] RV after coagulation of copolymer in methanol.
[3] Monomer.

EXAMPLE III

Copolymer IX was molded at 270° C. to a film. The film was exposed to an RS Sunlamp for 8 weeks at 25° C. It was also air-aged at 150° C. for 8 weeks. The results of testing are shown in Table II below.

TABLE II

| | Initial | 8 weeks, sunlamp | 8 weeks, 150° C. |
|---|---|---|---|
| Tensile modulus (p.s.i.) | 7,700 | 12,000 | 4,680 |
| 100% modulus (p.s.i.) | 750 | 1,000 | 860 |
| 300% modulus (p.s.i.) | 1,700 | 2,180 | 1,600 |
| Tensile strength (p.s.i.) | 2,100 | 2,450 | 1,600 |
| Elongation (percent) | 360 | 370 | 320 |
| RV | 1.17 | 0.87 | 1.09 |

The RS Sunlamp test was conducted as follows: Three R–S (Reflector Sunlamp) bulbs (R–40, 275 watts, inside frosted) are mounted on 10 inch centers, 14 inches above a kraft paper base. A small section of each specimen is masked from the Sunlamp to allow evaluation of color development. The tensile (Tensile Modulus, Tensile Strength, Elongation at Break) and impact (Modified Pendulum Impact) properties are measured after the first week and, depending on the rate of loss of mechanical properties, either each week or month after that until the sample becomes brittle, regardless of the amount of color development. With the above described lamp pattern, the temperature of the air of the sample area ranges from 45 to 50° C. depending on the season of the year. This entire R.S. Sunlamp apparatus is housed in a laboratory exhaust hood with low velocity air circulating through the test area.

EXAMPLE IV

Films were formed by compression molding various block copolymers of this invention at 270° C. Then the various physical properties of the films shown in Tables III and IV below were measured.

TABLE III
[Mechanical properties of the polycarbonate/polydimethylsiloxane block copolymers]

| Copolymer tested | Tensile modulus (p.s.i.) | 100% modulus (p.s.i.) | 300% modulus (p.s.i.) | Yield strength (p.s.i.) | Tensile strength (p.s.i.) | Yield, elongation (percent) | Elongation at break (percent) | Pendulum impact (ft. lbs./in.$^3$) | Remarks |
|---|---|---|---|---|---|---|---|---|---|
| II | 148,000 | | | 3,850 | 4,070 | 4.7 | 17–80 | 123–301 | Clear. |
| II [1] | 187,000 | | | | 5,160 | 4.5 | 10 | 71 | Cloudy. |
| III | 125,000 | | | 2,750 | 4,000 | 3.5 | 12–155 | 540 | Clear, became cloudy on annealing. |
| IV | 9,500 | 800 | 1,650 | | 2,350 | | 410 | 540 | Clear. |
| V | 2,000 | 500 | 1,150 | | 1,700 | | 530 | 600 | Do. |
| I | 750 | 280 | 680 | | 1,100 | | 520 | 380 | Do. |
| VI | 175,000 | | | 3,800 | 4,200 | 4.0 | 13–45 | 213 | Clear, became cloudy on annealing. |
| VII | 121,000 | | | 3,300 | 4,000 | 4.5 | 15–100 | 300 | |
| VIII | 25,000 | 1,700 | | | 2,400 | | 200 | 450 | |
| IX | 7,700 | 750 | 1,700 | | 2,100 | | 360 | 370 | |
| X | 1,120 | 440 | 1,000 | | 1,520 | | 450 | >370 | |

[1] Annealed 16 hours before testing.

TABLE IV

| Material tested | As molded | | Annealed at 100° C. | |
|---|---|---|---|---|
| | Tg (° C.) | Tm (° C.) | Tg (° C.) | Tm (° C.) |
| Copolymer: | | | | |
| II | 95 | | 100 | 210 |
| III | 80 | (1) | 80 | 220 |
| IV | −120, 50 | 200 | −120, 50 | 200 |
| V | −130, 40 | 190 | −130 | −50, 190 |
| I | −120 | 170 | | |
| VI | 115 to 120 | (1) | 115 to 120 | 250 |
| Silicone gum [2] | −130 | None | −130 | −50 |
| Polycarbonate I | 135 | None | 145 | 260 |
| Copolymer: | | | | |
| VII | 105 | (1) | 105 | 230 |
| VIII | −120, +80 | 230 | −120, +80 | 230 |
| IX | −130, +60 | 200 | −130 | −50, +200 |
| X | −115 | −50 & 190 | | |

[1] Crystallized on testing.
[2] Me$_3$SiO(Me$_2$SiO)/SiMe$_3$.

EXAMPLE V

The stability of Copolymer X was determined by immersing one sample in boiling water for eight weeks and by exposing a second sample to air at 150° C. for five weeks and then measuring the physical properties of the sample. The results are shown in Table VII below along with the physical properties of the samples before the boiling water and hot air tests.

TABLE VII

| | Initial | Boiling H$_2$O, wks. | 150° C. air, 5 wks. |
|---|---|---|---|
| Properties | 0.84 | 0.96 | 0.42 |
| Tensile modulus, p.s.i | 1,120 | 4,000 | 1,280 |
| 100% modulus, p.s.i | 440 | 680 | 380 |
| 300% modulus, p.s.i | 1,000 | 1,380 | 640 |
| Tensile strength, p.s.i | 1,520 | 1,600 | 640 |
| Elongation at break, percent | 450 | 360 | 300 |
| Recovery from break | Fair | Good | Fair |

EXAMPLE VI (A) Preparation of a dihydroxy-terminated polyester from 2,2,4,4-tetramethyl-1,3-cyclobutane diol and 1,4-cyclohexane dicarboxylic acid chloride A mixture of 28.8416 gms. of the diol (0.2 mole) and 38.47 gms. (0.184 mole) of 1,4-cyclohexanedicarboxyl chloride is placed in a flask equipped with a mechanical stirrer, condenser, and dry argon inlet tube. Circulation of dry argon is started. The flask is immersed in an oil-bath. Heating is started. When the temperature reached approximately 80° C. (all temperatures refer to the temperature of the bath) melting and evolution of hydrogen chloride began. The temperature is gradually increased to 150° C. within 1 hour and 30 minutes. Strong evolution of hydrogen chloride is observed and the clear colorless melt becomes viscous. After an additional 1 hour at 150° C. the temperature is increased to 280° C. The condenser is taken off and the flask is connected to a source of vacuum. It is kept for 3 hours at 280–290° C. under 0.5–1 mm. pressure.

After cooling the colorless hard crystalline solid is dissolved in methylene chloride (700 ml.). The solution so obtained is washed twice with distilled water. Each wash utilized one liter of distilled water and a stirring time of 0.5 hour. Each wash was followed by coagulation in methanol. A fine, white polyester is obtained in a 96% yield (51.73 grams). The polyester corresponds to the following formula:

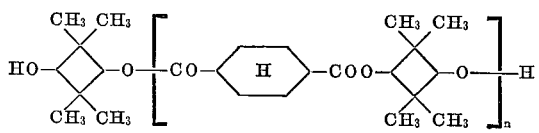

(B) Preparation of a dihydroxy-terminated polyester from 2,2,4,4 - tetramethyl - 1,3 - cyclobutane diol and terephthaloyl chloride Using a similar procedure the poly(terephthalate of 2,2,4,4-tetramethyl-1,3-cyclobutane diol) shown below is prepared.

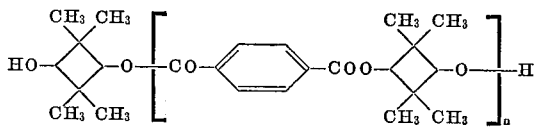

The amounts of starting materials are: 28.8416 gms. (0.2 mole) of the diol and 38.57 gms. (0.19 mole) of terephthaloyl chloride. The magnitude of the diol excess will determine the value of $n$ in this composition.

(C) Polyester-siloxane block copolymers

The block copolymers from the above-mentioned dihydroxy-terminated polyesters are prepared and the siloxane reactant of Example IC above by the procedure that is outlined in Example IC above.

What is claimed is:

1. A cyclobutane diol polyester-substituted organosilicon composition selected from the group consisting of:
(I) silanes having the formula:

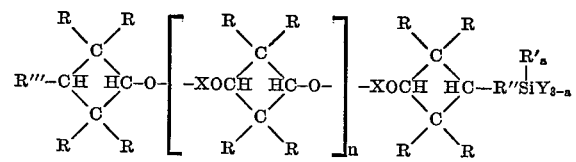

wherein R is a hydrogen atom or a monovalent hydrocarbon group, $n$ is a positive number, R' is a monovalent hydrocarbon group, $a$ has a value from 0 to 2 inclusive, X is —CO— or —OCR°CO—, R° is a divalent hydrocarbon group, Y is a monovalent hydrolyzable group, R'' is a divalent oxygen atom or a divalent organic group having a carbon atom bonded to the adjacent silicon atom and an oxygen atom bonded to the adjacent $$\overset{\diagdown}{\underset{\diagup}{\text{HC}}}-$$

group and R''' is

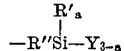

a hydroxyl group, an alkoxy group or an acyloxy group; and (II) block copolymers comprising from 1 to 99 weight percent of polyester blocks having the formula:

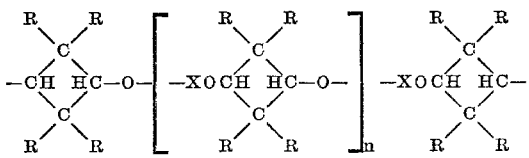

wherein R, n and X have the above-defined meanings and from 1 to 99 weight percent of siloxane blocks comprising groups having the formula:

$$Z_b SiO_{\frac{4-b}{2}}$$

wherein Z is a monovalent hydrocarbon group, a hydrocarbonoxy group, a divalent oxygen atom bonded to the silicon atom and to a

group of the polyester block or a divalent organic group having a carbon atom bonded to the silicon atom and an oxygen atom bonded to a

group of the polyester block, and b has a value from 1 to 3 inclusive, each siloxane block having at least one such divalent atom or group represented by Z.

2. A silane as defined in claim 1.
3. A block copolymer as defined in claim 1.
4. A composition as defined in claim 1 wherein X is —CO— and Z is methyl.
5. A composition as defined in claim 1 wherein X is —OCR°CO—, R° is an alkylene group having from 2 to 10 carbon atoms inclusive and R is methyl.
6. A composition as defined in claim 1 wherein X is —OCR°CO—, R° is an arylene group and R is methyl.
7. A silane as defined in claim 1 wherein Y is an alkoxy group or a halogen atom.
8. A thermoplastic block copolymer comprising (A) from 5 to 95 weight percent of at least two cyclobutane diol polyester blocks having the formula:

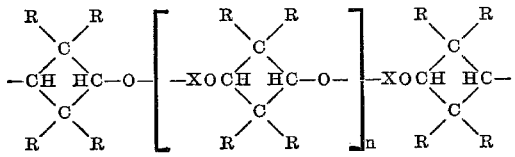

wherein R is a hydrogen atom or a monovalent hydrocarbon group, X is —CO— or —OCR°CO—, R° is a divalent hydrocarbon group, and n is a positive number, said polyester blocks each having a molecular weight from 2000 to 50,000; and (B) from 5 to 95 weight percent of at least one siloxane block represented by the formula:

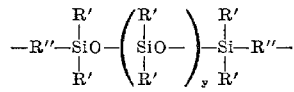

wherein R' is a monovalent hydrocarbon group, R'' is a divalent oxygen atom bonded to the adjacent silicon atom and to a

group of the polyester block or a divalent organic group having a carbon atom bonded to the adjacent silicon atom of the siloxane block and an oxygen atom bonded to a

group of the polyester block and y is a positive number, each siloxane block having an average molecular weight from 500 to 100,000, said block copolymer having a reduced viscosity of at least 0.4 deciliters per gram.

9. A thermoplastic and elastomeric block copolymer as defined in claim 8 wherein the block copolymer has a tensile modulus from 100 to 10,000 pounds per square inch, the polyester blocks constitute from 5 to 50 weight percent of the block copolymer and the siloxane blocks constitute from 50 to 95 weight percent of the copolymer.

10. A thermoplastic and rigid block copolymer as defined in claim 8 wherein the block copolymer has a tensile modulus from 15,000 to 150,000 pounds per square inch, the polyester blocks constitute from 60 to 95 weight percent of the block copolymer and the siloxane blocks constitute from 5 to 40 weight percent of the block copolymer.

11. A thermoplastic block copolymer as defined in claim 8 wherein from 0.1 to 3.0 mol percent of the monovalent hydrocarbon groups represented by R' are alkenyl groups.

12. A thermoset composition produced by curing the block copolymer of claim 11 in the presence of a cure catalyst for the alkenyl groups.

13. A thermoplastic block copolymer as defined in claim 8 wherein from 20 to 80 percent of the cyclobutylene groups are in the trans form.

References Cited

UNITED STATES PATENTS

| | | | |
|---|---|---|---|
| 2,605,243 | 7/1952 | Sowa | 260—824 |
| 2,821,518 | 1/1958 | Edelman et al. | 260—824 |
| 3,189,662 | 6/1965 | Vaughn | 260—824 |
| 3,313,777 | 4/1967 | Elam et al. | 260—77.5 |
| 3,379,790 | 4/1968 | Krauss et al. | 260—824 |
| 3,384,599 | 5/1968 | Omietanski et al. | 260—824 |
| 3,419,634 | 12/1968 | Vaughn | 260—824 |

SAMUEL H. BLECH, Primary Examiner

U.S. Cl. X.R.

117—126, 132, 161; 260—46.5, 75, 77.5, 448.2, 448.8, 463; 264—346

PO-1050
(5/69)

UNITED STATES PATENT OFFICE
CERTIFICATE OF CORRECTION

Patent No. 3,579,607  Dated May 18, 1971

Inventor(s) M. Matzer and A. Noshay

It is certified that error appears in the above-identified patent and that said Letters Patent are hereby corrected as shown below:

Column 1, lines 60-62 that left-hand portion of the formula shown as "  O  " should read --- O ---.
                                    -OCO                    -OCO
Column 5, lines 16-17, that left-hand portion of the product formula of equation (d-2) shown as "≡COOCCN" should read --- ≡COOCN ---. Column 5, line 21, that left-hand portion of the silicon reactant of equation (f) shown as "CiO" should read --- ClO---. Column 6, lines 62-64 that left-hand portion of the product of the equation shown as "ClCOC-" should read --- ClCOO- ---. Columns 11-12, TABLE III in the heading referring to "Pendulum impact" the designation "iu." should read --- in.---. Column 13, line 16 that right-hand portion of the siloxane formula shown as " )/SiMe$_3$" should read --- )$_x$SiMe$_3$ ---. Column 15, line 2 of claim 4, the number "2" should read --- R ---.

Signed and sealed this 9th day of November 1971.

(SEAL)
Attest:

EDWARD M.FLETCHER,JR.          ROBERT GOTTSCHALK
Attesting Officer              Acting Commissioner of Patents